United States Patent [19]

Torres et al.

[11] 3,797,510
[45] Mar. 19, 1974

[54] CRASHWORTHY VALVE

[75] Inventors: Jorge Torres, Newbury Park; George W. Lane, Camarillo, both of Calif.

[73] Assignee: Purolator, Inc., Rahway, N.J.

[22] Filed: Oct. 28, 1971

[21] Appl. No.: 193,354

[52] U.S. Cl................ 137/68, 137/614.04, 251/66
[51] Int. Cl.............................................. F16k 17/40
[58] Field of Search ..... 137/68, 71, 614.04, 614.05, 137/614.06, 797; 251/66, 74, 149.1

[56] References Cited
UNITED STATES PATENTS

| | | | |
|---|---|---|---|
| 3,719,194 | 3/1973 | Anderson et al. | 137/68 |
| 3,043,542 | 7/1962 | Neuschotz | 137/68 X |
| 3,630,214 | 12/1971 | Levering | 137/68 |
| 2,135,222 | 11/1938 | Scheiwer | 137/614.04 |
| 3,312,431 | 4/1967 | Vogt | 137/68 X |
| 345,156 | 7/1886 | Little | 137/71 |

Primary Examiner—Robert G. Nilson

[57] ABSTRACT

A crashworthy valve comprising a valve body having a passage therein, a valve seat in the passage, a valve element mounted for movement in the passage and biased toward a closed position in which it is in engagement with the valve seat to close the passage. A coupling interconnects the valve body to a member which is adapted to carry fluid. The valve element is normally retained in an open position in which the valve element is spaced from the valve seat by at least a predetermined distance. The valve element is automatically released for movement to the closed position in response to relative axial movement between the valve body and the member of less than said predetermined distance.

19 Claims, 10 Drawing Figures

PATENTED MAR 19 1974
3,797,510
SHEET 1 OF 4
Fig. 1
Fig. 2
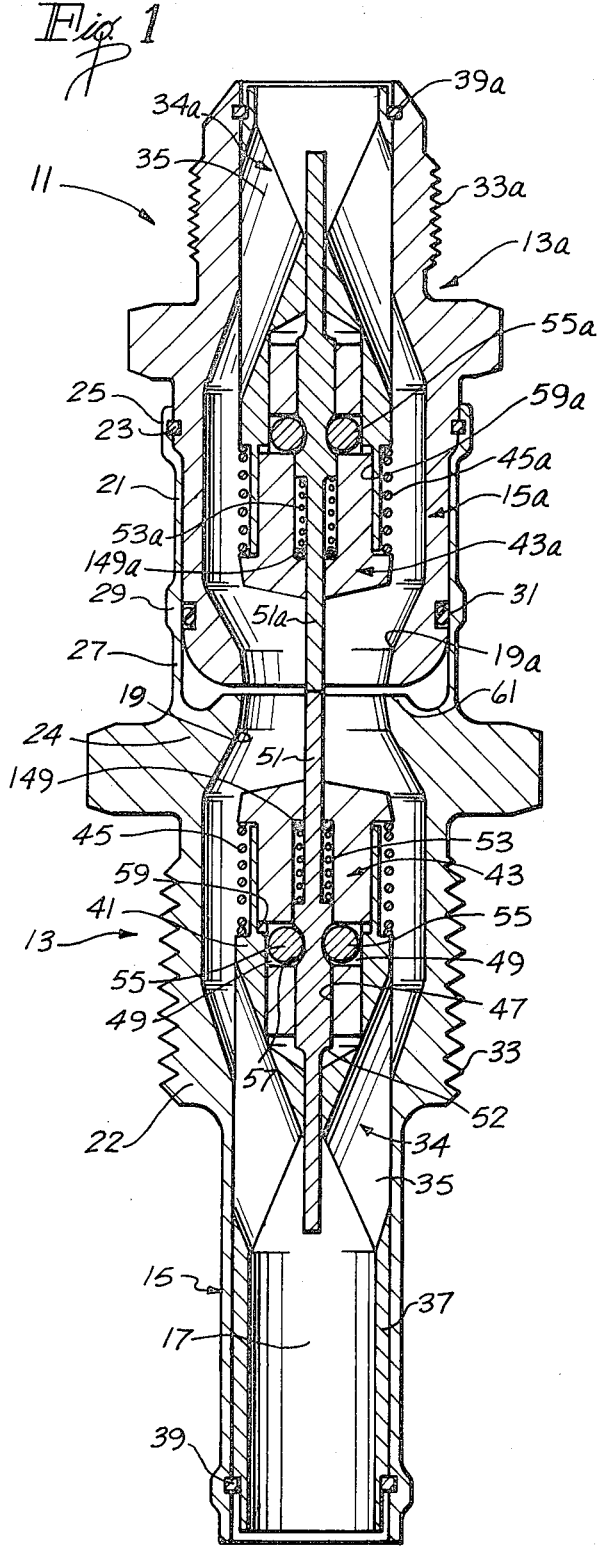
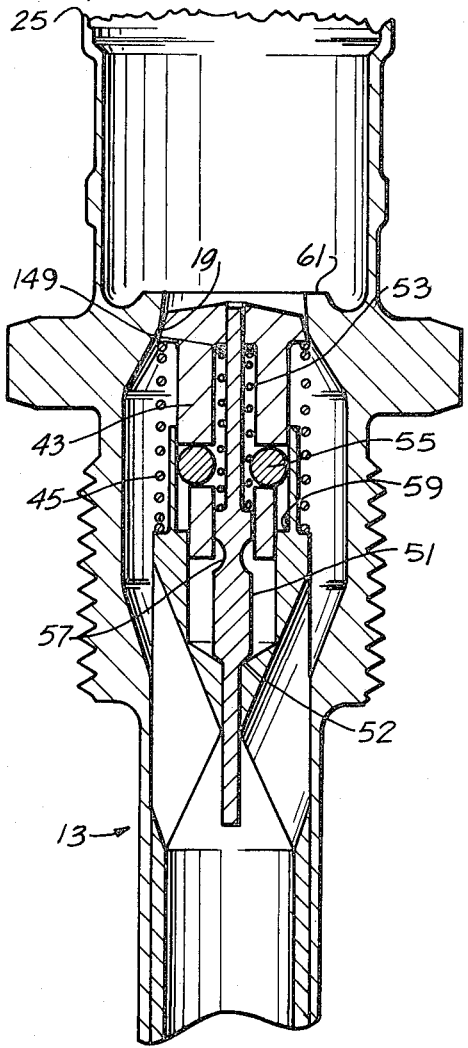
INVENTOR:
Jorge Torres
George W. Lane
By Smyth, Roston & Pavitt
ATTORNEYS

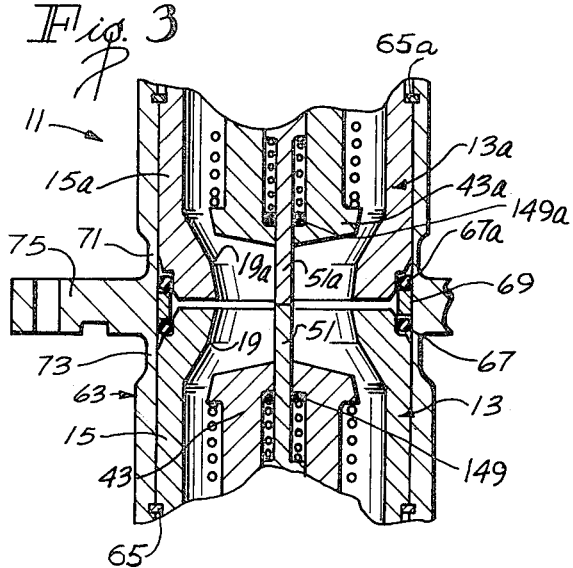
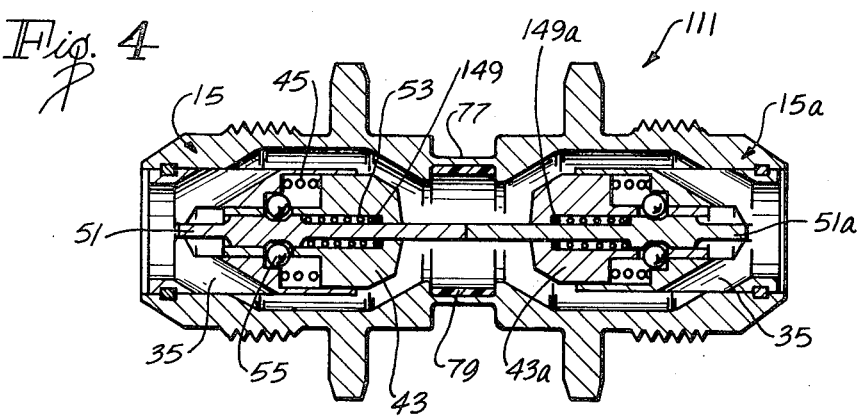

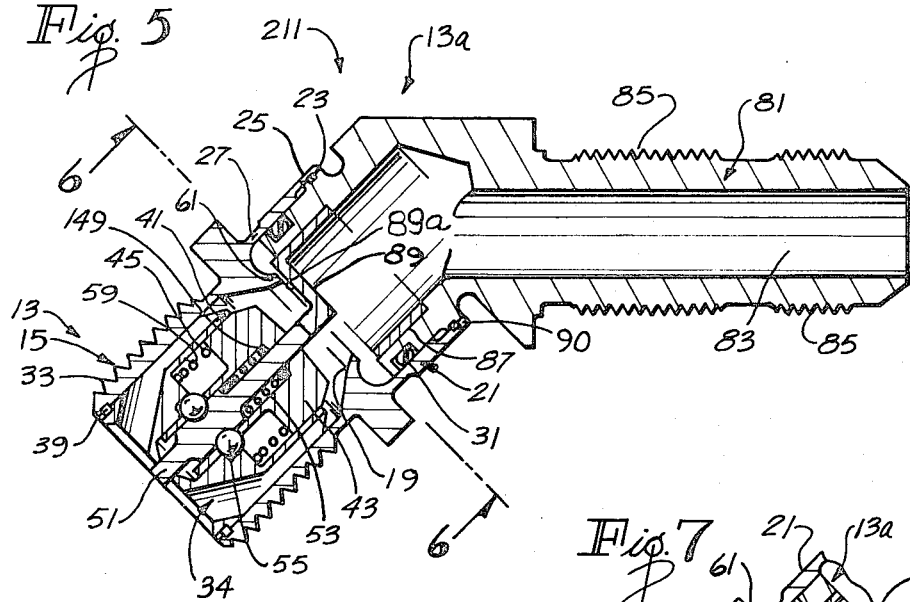
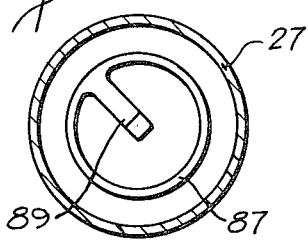
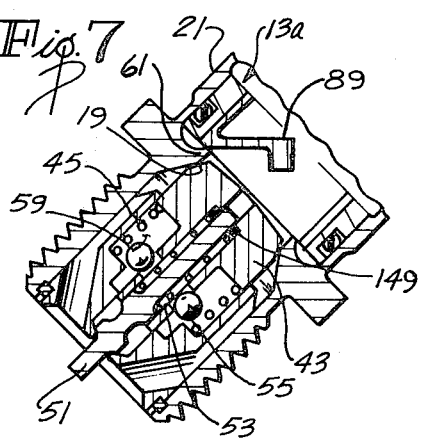
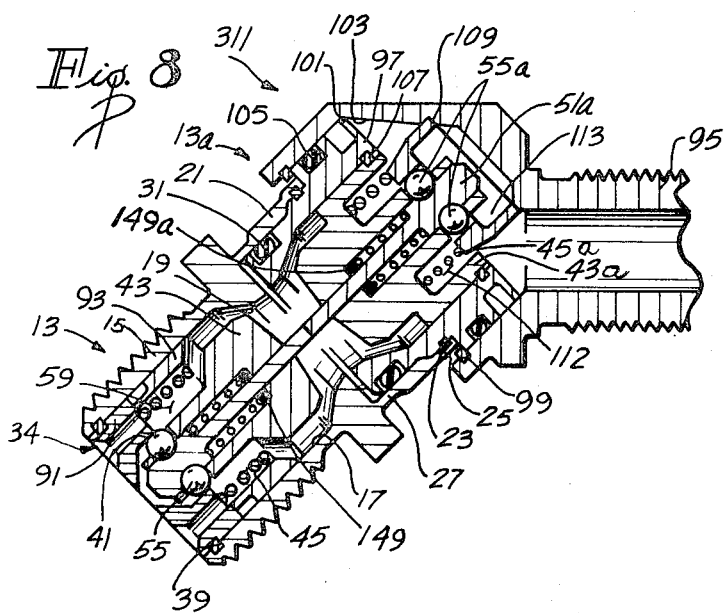

INVENTORS:
Jorge Torres
George W. Lane
By: Smyth, Roston & Pavitt
ATTORNEYS

CRASHWORTHY VALVE

BACKGROUND OF THE INVENTION

One of the primary dangers associated with aircraft crashes is the breakage of fuel lines and the consequent spillage of fuel. The spilled fuel creates a very dangerous fire hazard.

In an attempt to solve this problem, crashworthy valves are used. A crashworthy valve contains a weakened region so that the failure of the fuel line will occur at the valve. The crashworthy valve is responsive to such failure to close the fuel line to prevent substantial fuel spillage.

The present invention is directed to the solution of several problems heretofore associated with crashworthy valves. Foremost among these problems is the problem of obtaining closure of the valve in response to minimum distortion of the weakened region of the valve. A typical crashworthy valve includes a valve element normally held in an open position in which it is spaced a predetermined distance from a valve seat. With prior art devices, the deformation of the weakened region must result in axial displacement at least equal to the spacing between the valve element and the valve seat in order to allow the valve element to close. In a case where two opposed valve units are used, this displacement must be at least equal to twice the spacing between the valve element and the valve seat. Characteristically this means that the weakened region must completely fracture and separate before the valve element is closed. This delay between initial fracture and closing of the valve may allow the spillage of some fuel.

A second significant problem is how to prevent debris from forcing the valve element open after fracture has occurred. Some prior art devices have elements of the valve projecting axially beyond the valve body and beyond the valve element when the valve is closed. The present invention is based, in part, upon the recognition that such projections facilitate the opening of the valve element by debris after a crash has occurred.

SUMMARY OF THE INVENTION

The general objective of this invention is the provision of a crashworthy valve which minimizes fuel spillage when a crash occurs. This objective is accomplished, in part, by causing the crashworthy valve to close in response to the weakened region of the valve undergoing only a minimum predetermined deflection. The amount of deflection or displacement required is much less than the axial distance between the valve element and the valve seat. With this invention the valve element can be caused to close even though the valve deflects and is not broken into separate pieces. The crashworthy valve can be made to close in response to deflection which results from tension, compression, bending or shear.

This concept can be implemented by locking a restaining element to the valve element with a releasable detent so that the restraining element and valve element move together. Normally the restraining element is retained to hold the valve element in an open position. The restraining element and the valve element can be held in the open position by, for example, the restraining element of a corresponding, opposed valve section or by a bendable tab. When the crashworthy valve is subjected to predetermined loading, it deflects or fractures and this allows the restraining element and the valve element to move together as a unit a very small distance axially. The detent automatically releases in response to such axial movement whereupon the valve element is immediately biased to the closed position. This occurs before the crashworthy valve is totally separated.

The crashworthy valve includes first and second valve sections which are held together by a coupling having a weakened region. The weakened region deflects under load thereby causing relative movement between the valve sections. The restraining element and the element which holds the restraining element in the open position are movable with the first and second valve sections, respectively. This relative movement, if sufficient, releases the detent to free the restraining element. In this manner, the crashworthy valve is made responsive to the relative movement between the valve sections. Of course, the detent can be made to release in response to different loads and degrees of relative movement. To optimize results under different loading modes, e.g., tension, shear and compression, the coupling preferably includes multiple weakened regions with each of the weakened regions being relatively weak for a different mode of loading.

Another feature of this invention is that no parts of the valve project axially outwardly beyond the valve body or the valve element in the case where the valve is completely severed. The accomplishing of this desirable result is made more difficult in that the preferred embodiments of the present invention employ the restraining element which projects axially of the valve element in the open position of the valve. To prevent this relationship from being maintained in the closed position, the release of the detent means frees the restraining element for axial movement relative to the valve element and biasing means are provided to retract the restraining element when the restraining element is freed for axial movement independently of the valve element. Accordingly, with the valve in the closed position the restraining element does not project axially beyond the valve element in the direction of the free end of the severed valve. As the restaining element does not project axially beyond the valve element and because the restraining element is movable axially relative to the valve element, it cannot be engaged by debris and caused to open the valve element.

A related feature is that the valve element is recessed slightly from the adjacent end of the valve body in the closed position. If the valve element were to project axially of the valve body it would increase the probability that it would be forced open by debris or external members.

Another feature which contributes to the minimization of spillage is that the valve remains in a sealed condition even after failure and partial separation has occurred. This is accomplished by the use of suitable coupling means and appropriate seal location. For example, in one form of the invention two sections of the crashworthy valve are telescoped together and the weakened region which is subject to failure in tension is on the female member. The seal is positioned intermediate the weakened region and the inner end of the female member with the result that seal continuity is maintained even after rupture at the weakened region. This provides still additional time for closure of the valve element.

The crashworthy valve includes two valve sections interconnected by coupling means which includes a frangible or weakened region. In some forms of the invention the valve sections are nearly identical. The valve elements of the two valve sections are both held in the open position by the two restraining elements, the ends of which are in engagement. When the weakened region deforms a predetermined amount or fractures, the relative movement between the two restraining elements and their associated valve bodies allows the detent means to release, and the valve elements are forced closed. The two valve seats of the two valve sections should be located very close to each other to minimize the volume therebetween because this volume represents an amount of fuel which will inherently be allowed to escape when the valve ruptures.

The concepts of this invention can be embodied in many different physical forms. For example, various interconnecting means may be utilized to connect the two sections of the crashworthy valve. The two valve sections may be relatively rotatable or rigidly interconnected.

The invention can best be understood by reference to the following description taken in connection with the accompanying illustrative drawings.

BRIEF DESCRIPTION OF THE DRAWINGS

FIG. 1 is an axial sectional view through one form of crashworthy valve constructed in accordance with the teachings of this invention with the valve being in the open position.

FIG. 2 is a fragmentary, sectional view similar to FIG. 1 illustrating one of the valve sections following failure of the weakened region and complete severance of the two valve sections.

FIG. 3 is an axial sectional view through a valve illustrating alternate coupling means for the two valve sections.

FIG. 4 is a longitudinal sectional view through a second embodiment of the present invention in which the valve sections are integrally interconnected.

FIG. 5 is an axial sectional view through a third embodiment of the present invention in which one valve element is employed.

FIG. 6 is a sectional view taken generally along line 6—6 of FIG. 5.

FIG. 7 is a fragmentary, axial sectional view of the valve sections of FIG. 5 after a compression failure.

FIG. 8 is a fragmentary axial sectional view through a sixth embodiment of the present invention.

DESCRIPTION OF THE PREFERRED EMBODIMENT

Figure 9:
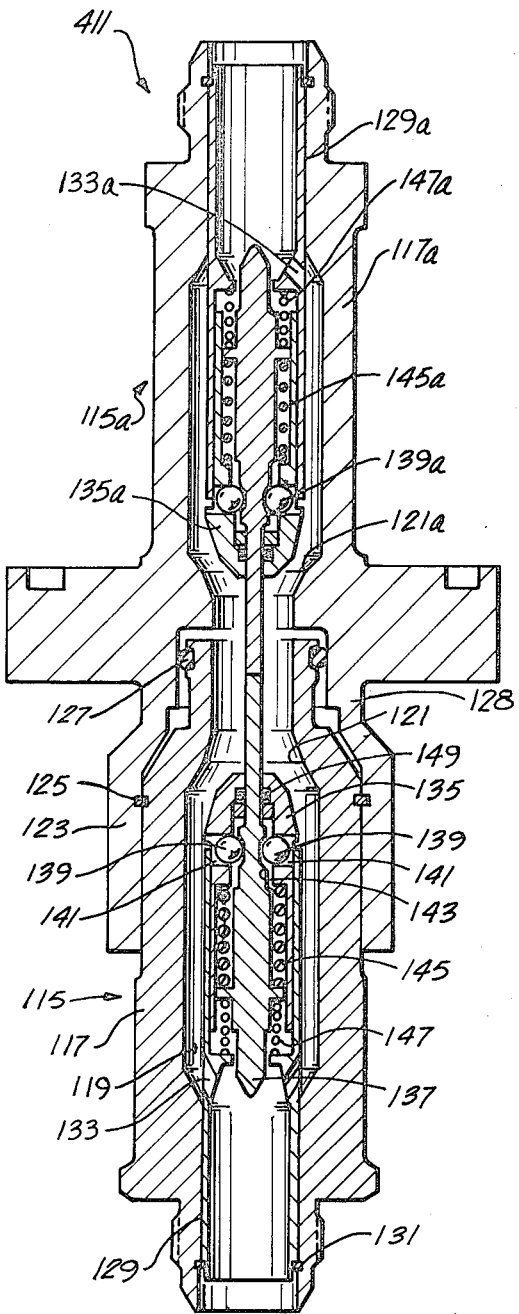
FIG. 9 is an axial sectional view through a fifth embodiment of crashworthy valve constructed in accordance with the teachings of this invention. This embodiment employs alternate coupling means and an alternate mechanism for biasing the valve element and the restraining element.

FIG. 1 shows a crashworthy valve 11 which includes two valve sections 13 and 13a which form body means. The valve sections 13 and 13a are nearly identical, and for this reason, only the valve section 13 is described in detail. Parts of the valve section 13a which correspond to parts of the valve section 13 are designated by corresponding reference characters followed by the letter a.

The valve section 13 includes a member or valve body or section 15 having a fluid carrying passage 17 extending axially therethrough and defining a valve seat 19. The valve body 15 has a coupling section 21 which is integral with a main portion 22 of the valve body 15. The coupling section 21 is in the form of a sleeve which receives an end portion of the valve body 15a and is connected thereto by a retaining ring 23 which allows swivelling of the valve sections 13 and 13a relative to each other about their longitudinal axes.

The coupling section 21 has annular frangible or weakened regions 25 and 27 spaced axially along the coupling section. The weakened region 25 is located at the retaining ring 23 and will deform or fracture in response to predetermined tension and/or bending loads. The weakened region 27 is located in a radial plane which is substantially at the inner end of the coupling section 21. The weakened region 27 is rupturable or deformable in response to shear loads.

The coupling section 21 has an annular thickened region 29 located axially intermediate the weakened regions 25 and 27. An annular seal 31 in the form of a resilient elastomeric O-ring is carried in a groove by the valve body 15a and sealingly engages the thickened region 29. By thickening, and therefore strengthening of the region 29, the region 29 will remain relatively nondeformable so that a good seal between the seal 31 and the region 29 will be maintained while the weakened regions 25 and 27 deform.

The valve body 15 has external threads 33 to facilitate mounting of the valve body on an external member (not shown) such as a fuel line of an aircraft. The valve bodies 15 and 15a are nearly identical except for dimensional changes, the lack of any coupling section on the valve body 15a, and other minor variations shown in FIG. 1.

A mounting member 34 which includes a spider 35 and a tubular section 37 is mounted within the passage 17. Although the mounting member 34 could be permanently mounted within the passage 17, in the embodiment illustrated it abuts a retaining ring 39 held in a groove in the valve body 15. The mounting member 34 also includes a tubular section 41 in which a valve element 43 is slidably mounted for axial movement toward and away from the valve seat 19. The valve element 43 is biased toward a closed position in which it sealingly engages the valve seat 19 by a coil compression spring 45 which acts between the valve element and the tubular section 41. The valve element 43 has an axial passage 47 extending therethrough and a plurality (two being shown) of radial apertures 49 extending through the valve element and communicating with the passage 47.

An elongated restraining element in the form of a rod or stem 51 is slidably mounted in the passage 47 and in the mounting member 34. The restraining member has a shoulder 52 which is spaced from the spider 35 in the position of FIG. 1. THe restraining element 51 is urged to a retracted position (downwardly as viewed in FIG. 1) by a spring 53 which acts between the valve element 43 and the stem. A pair of detents or locking members 55 in the form of balls are received in the radial apertures 49 and engage an annular groove 57 formed in the stem 51. In the open position of the valve 11 shown in FIG. 1, the detents 55 are held against radial outward movement by the tubular section 41, and accordingly the stem 51 and the valve element 43 are locked against relative axial movement. However, the tubular section 41 has an enlarged passage section 59 which begins a very short distance axially of the location of the detents 55 shown in FIG. 1. Accordingly, if the stem 51 and the valve element 43 are moved axially as a unit upwardly (as viewed in FIG. 1) relative to the valve body 15, the detents 55 will ultimately confront the enlarged passage section 59 and move radially outwardly to free the stem 51 and the valve element 43 for independent axial movement. A seal 149 seals between the stem 51 and the valve element 43 and is loaded by the spring 53. This seal 149 prevents leakage between the stem 51 and the valve element 43 after failure and valve closure.

The stem 51 cooperates with the stem 51a to prevent the valve elements 43 and 43a from being urged to their closed positions by the springs 45 and 45a. Specifically, the ends of the stems 51 and 51a are in abutting relationship substantially at the end of the valve body 15a. Because both of the valve elements 43 and 43a are "bottomed out" in the mounting members 34 and 34a, respectively, and because the valve bodies 15 and 15a are locked together, no relative movement of the type which would release the detents 55 and 55a is possible absent deflection or fracture of the valve. Thus, each of the stems 51 and 51a forms an abutment for the other. In this position fuel or other fluid gas flow through the passages 17 and 17a.

In operation of the crashworthy valve 11, a tensile force of predetermined magnitude applied to the valve, such as may occur during a crash of an aircraft, will cause fracture of the weakened region 25 and ultimate separation of the valve sections 13 and 13a as shown in FIG. 2. As the weakened region 25 begins to elongate as a result of the valve sections 13 and 13a beginning to axially separate, the stems 51 and 51a and their associated valve elements 43 and 43a axially advance relative to the valve body 15. The relative axial movement may be the result of axial movement of one or both of the stems 51, 51a and the valve bodies 15, 15a. In the embodiment illustrated the stems 51 and 51a remain stationary and deflection of the weakened region 25 allows the valve bodies 15 and 15a to move away from each other thereby creating relative axial movement between the detents 55 and 55a and the enlarged passage sections 59 and 59a, respectively. Ultimately, the relative axial advance is sufficient to allow the detents 55 and 55a to escape into the enlarged passage sections 59 and 59a. When this occurs, the spring 45 rapidly forces the valve element 43 to the closed position (FIG. 2) in which it engages the valve seat 19. Simultaneously the spring 53 acts on the stem 51 to axially retract the latter inwardly relatively to the valve element 43. As shown in FIG. 2, the stem 51 is also axially retracted from the position which it occupied in FIG. 1 in that the shoulder 52 contacts the spider 35. The valve element 43 is recessed axially inwardly from the end 61 of the main valve body section 22. Accordingly, nothing projects axially beyond the end of the annular ridge 61 or beyond the valve element 43 which might engage debris and cause the valve element 43 to be moved off of its seat 19. The valve section 13a similarly moves to a closed position simultaneously with the valve element 13. Because of the close proximity of the valve seats 19 and 19a, there is only a minor quantity of fuel between the valve seats which can escape. While the valve sections 13 and 13a are separating, the seal 31 maintains sliding contact with the inner surface of the coupling section 21 to thereby prevent leakage. Thus, sealing continuity is maintained while the stems 51 and 51a undergo the necessary relative axial movement to allow release of the detents 55 and 55a.

With the present invention the amount of axial movement necessary to trigger the valve 11 is substantially less than the distance moved by the valve element in moving from the open position of FIG. 1 to the closed position of FIG. 2. This is true in all of the embodiments illustrated. For example, the valve 11 may be constructed to trigger in response to 0.040 inch of relative axial movement, 0.070 inch of relative radial movement, or 5° or relative bending.

With the present invention, the amount of relative axial movement between the stem 51 and the valve body 15 necessary to release the detents 55 can be varied to suit particular design requirements. For example, the size of the detents 55 could be reduced and/or the detents could be placed closer to the end of the enlarged passage section 59 to thereby reduce the necessary movement required to release the detents.

If the crashworthy valve 11 is subjected to bending, the weakened region 25 deforms and ultimately fractures. Under bending loads, the ends of the stems 51 and 51a become misaligned and at a preselected angle which may be, for example, 5° or 6° the misalignment is sufficient to allow the stems 51 and 51a to slip past each other to cause closure of the valve sections 13 and 13a.

The weakened region 27 deflects and will ultimately rupture in response to shear loads. The valve sections 13 and 13a are actuated, i.e., closed, when the shear deformation is sufficient to radially misalign the stems 51 and 51a so that they can slip by each other.

FIG. 3 shows a crashworthy valve 11 which is identical to the crashworthy valve 11 (FIGS. 1 and 2) in every respect except the manner of interconnection of the two valve sections 13 and 13a. Parts of the valve of FIG. 3 corresponding to parts of the valve of FIGS. 1 and 2 are designated by corresponding reference numerals. The valve body 15 differs from the valve body 15 of FIGS. 1 and 2 in that the former has no coupling section formed integrally therewith. Rather, the valve of FIG. 3 employs a coupling sleeve 63 which is a separate element and which is connected to the valve bodies 15 and 15a by retaining rings 65 and 65a. The retaining rings 65 and 65a allow the valve bodies 15 and 15a to swivel about their longitudinal axes relative to each other and relative to the coupling sleeve 63.

Another difference between the embodiment of FIG. 3 and the embodiment of FIG. 1 is that the valve bodies 15 and 15a of the former cooperate to define adjacent their confronting ends an annular seal groove. The seal groove receives annular elastomeric seals 67 and 67a which are separated by an annular spacer 69 which may be constructed of, for example, Teflon or aluminum.

Still another difference is that the coupling sleeve 63 has annular weakened regions or frangible areas 71 and 73 located adjacent the seals 67 and 67a and on opposite sides of a centrally located flange 75. The weakened regions 71 and 73 will deflect and rupture in response to tension, bending, or shear. Of course, the sensitivity of the crashworthy valve to the various modes of loading can be easily controlled by varying the dimensions and the shape of the weakened regions 71 and 73.

FIG. 4 shows a second embodiment of the crashworthy valve 111 which is similar to the valve 11 (FIGS. 1 and 2). Parts of the valve 111 which correspond to parts of the valve 11 (FIGS. 1 and 2) are designated by corresponding reference characters. As the valve 111 and the valve 11 (FIGS. 1 and 2) are very similar, only the differences are described in detail herein.

The crashworthy valve 111 has valve bodies 15 and 15a integrally connected by a coupling section 77 formed integrally with both of the valve bodies. In the embodiment illustrated, the coupling section 77 is in the form of a cylindrical sleeve. The coupling section 77 is relatively thin and forms a weakened region or frangible region.

a tubular seal 79 of elastomeric material fits snugly within, and is axially coextensive with, the coupling section 77. In other respects, except for dimensional variations, the crashworthy valve 111 is substantially identical to the crashworthy valve 11 (FIGS. 1 and 2).

The coupling section 77 deforms and fractures in response to tension, bending or shear loads of predetermined magnitudes. When the coupling section 77 fractures, the tubular seal 79 remains intact to seal the region between the ends of the valve bodies 15 and 15a. The valve elements 43 and 43a are closed and the stems 51 and 51a are retracted in the same manner as described hereinabove with reference to FIGS. 1 and 2.

FIGS. 5-7 show a crashworthy valve 211 which includes valve sections or bodies 13 and 13a. Except for dimensional differences, the valve section 13 of the valve 211 is substantially identical to the valve section 13 of the valve 11 (FIGS. 1 and 2). Parts of the valve section 13 of the valve 211 which correspond to parts of the valve section 13 of the valve 11 (FIGS. 1 and 2) are designated by corresponding reference characters.

The primary differences between the valve 11 (FIGS. 1 and 2) and the valve 211 is in the valve section 13a. The crashworthy valve 211 has only a single valve element, i.e., the valve element 43, and the valve element 43 is designed to close in response to compressive loading of a predetermined magnitude as well as in response to tension, bending and shear loads.

The valve section 13a (FIGS. 5-7) includes a member or valve body 81 having a 45° bend and having a passage 83 extending axially therethrough. The valve body 81 carries a seal 31 for cooperation with the coupling section 21 as described hereinabove with reference to FIGS. 1 and 2. In addition, the valve body 81 is mounted on the coupling section 21 by a retaining ring 23 which permits swivelling of the body 81 relative to the valve section 13 about the axis of the valve section 13 as described hereinabove with reference to FIGS. 1 and 2. The valve body 81 can be connected to an external member such as a fuel line by external threads 85.

A tubular insert 87 is mounted in a counterbore at the lefthand end (as viewed in FIG. 5) of the valve body 81. The insert 87 has a restraining element in the form of a radially projecting tab 89 which normally engages the end of the stem 51 to hold the latter and the valve element 43 in the open position. The tab 89 is relatively stiff but bendable about its juncture with the tubular section of the insert 87 in an axial direction away from the stem 51. The tab 89 has sufficient strength to maintain the valve element 43 open and has an axially offset portion defining a recess 89a.

The weakened region 25 is responsive only to bending and tension loads and the weakened region 27 is responsive to shear loads. The valve body 81 has an annular rib 90 engageable with the retaining ring 23 which is made subject to failure in response to a compressive load of predetermined magnitude. Tension loads tend to pull the stem 51 away from the tab 89 with consequent advancing movement of the valve element 43 and the stem 51 until the detents 55 are released. In the closed position the valve element 43 and the stem 51 occupy the same relative positions as in the embodiment of FIGS. 1 and 2. Bending and shear loads radially misalign the tab 89 and the stem 51 to cause release of the detents 55. If the radial misalignment is along the tab 89, the stem 51 moves into the recess 89a to thereby trigger the valve.

Compressive loading advances the valve body 15 toward the valve body 81 with consequent distortion and/or fracture of the rib 90. The mounting member 34 is seated on the retaining ring 39 and advances with the valve body 15 as does the stem 51. However, the rib 61 of the valve body 15 advances therewith and bends the tab 89 to the position shown in FIG. 7. Because the rib 61 engages a radial outer region of the tab 89 and the stem 51 engages a central region of the tab, the central region of the tab is moved sufficiently to allow the stem 51 and the valve element 43 to move relative to the valve body 15. This frees the detents 55 to allow the valve element 43 to be moved to the closed position and to allow retraction of the stem 51.

FIG. 8 shows a crashworthy valve 311 which is similar to the valves 11 (FIG. 1) and 211. The crashworthy valve 311 includes valve sections 13 and 13a with the valve section 13 being nearly identical to the valve section 13 of the valve 211 (FIGS. 5-7). Parts of the valve 311 corresponding to parts of the valve 211 are designated by corresponding reference characters.

The valve element 43 is seated against an internal sleeve 91 mounted in the valve body 15 to thereby prevent further movement of the valve element 43 away from the valve seat 19. The valve element 43 includes an annular skirt 93 which is slidable in the passage 17 to thereby mount the valve element in the valve body 15. In other respects, the valve section 13 of the valve 311 is nearly identical to the valve section 13 of the valve 211 (FIGS. 5-7).

The valve section 13a includes a valve body made up of sections 95 and 97 with the latter being telescoped within an outer section of the former and retained therein by a retaining ring 99. The section 97 contains an annular flange 101 which abuts an inner surface 103 of the section 95. The flange 101 deforms and fails in response to predetermined compressive loads acting along the longitudinal axis of the section 97. A seal 31 on the section 97 functions in the same manner as the seal 31 (FIG. 5) and another elastomeric seal 105 seals the interface between the sections 95 and 97.

The valve section 13a includes a valve element 43a and a stem 51a which are identical to the correponding elements of the valve section 13 of the valve 311. The valve element 43a is prevented from moving rearwardly, i.e., upwardly as viewed in FIG. 8 by a retaining ring 107.

The valve section 13a also includes a mounting member 109 suitably mounted in the section 95 and providing means for retaining the detents 55a in a locked position. However, the mounting member 109 provides enlarged sections 112 and 113, respectively, on the opposite ends thereof to thereby provide space into which the detents 55a can move.

The weakened region 25 deforms and fails in response to bending and tension loads and the weakened region 27 deforms and fractures in response to shear loads substantially as described hereinabove with reference to FIGS. 1 and 2. In response to a tension load, the stems 51 and 51a advance with their respective valve elements 43 and 43a relative to the valve body 15 until the detents 55 and 55a escape into the enlarged sections 59 and 112, respectively. More specifically, the stems 51, 51a remain stationary and the valve bodies 15, 15a tend to axially separate. The detents 55 and 55a similarly escape in response to bending or shear loads which sufficiently misalign the ends of the stems 51 and 51a.

In response to a compressive load acting along the axis of the valve section 13, the flange 101 is deformed downwardly and to the left as viewed in FIG. 8 by the surface 103. This moves the valve body section 95 and the mounting member 109 downwardly and to the left. The valve element 43 cannot move downwardly and to the left because it abuts the sleeve 91. The stem 51 cannot move downwardly and to the left because the detents 55 lock the stem 51 to the valve element 43. The stem 51a and the valve element 43a cannot move downwardly and to the left because the valve stem 51a abuts the valve stem 51. Accordingly, the movement of the mounting member 109 downwardly and to the left is relative to the detents 55a with the result that the detents can escape into the enlarged section 113 thereby releasing the detents whereupon both valve elements 43 and 43a are advanced to the closed positions and both stems 51 and 51a are retracted substantially as described hereinabove with reference to FIGS. 1 and 2.

Figure 10:
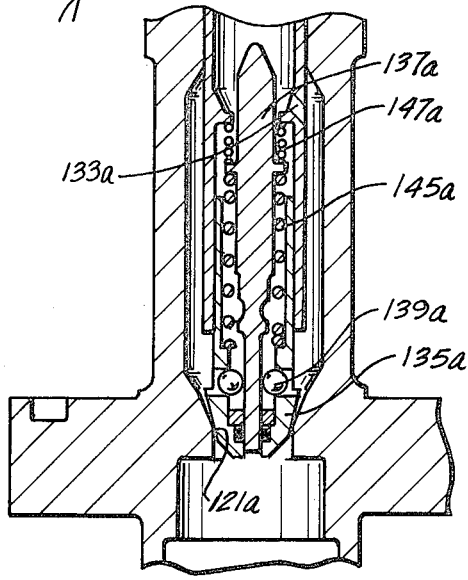
FIG. 10 is a fragmentary axial sectional view of one of the valve sections of FIG. 9 following separation of the two valve sections.

FIGS. 9 and 10 show a crashworthy valve 411 which functions substantially like the valve 11 (FIGS. 1 and 2), but contains different structure. The crashworthy valve 411 includes valve sections 115 and 115a. As the valve sections 115 and 115a are substantially identical, only the valve section 115 is described in detail and corresponding parts are designed by corresponding reference numerals followed by the letter a.

The valve section 115 includes a valve body 117 having an axial passage 119 extending therethrough and defining a valve seat 121. The valve body 117a is identical to the valve body 117 except that the former has a sleeve-like coupling section 123 which receives a portion of the valve body 117 and which is connected thereto for relative rotation by a retaining ring 125. An annular elastomeric seal 127 seals the interface between the coupling section 123 and the valve body 117. The coupling section 123 has a single weakened region 128 which is deformable and rupturable in response to bending, tension or shear loads.

A tubular mounting member 129 is retained within the passage 119 by a retaining ring 131. The mounting member 129 has one or more parts 133 therein. A tubular valve element 135 is mounted for axial movement by the mounting member 129. A restraining element in the form of a stem 137 is mounted for axial movement by the valve element 135. Detents 139 which are mounted in radial apertures 141 of the valve element 135 engage an annular groove 143 formed in the stem 137 to lock the stem to the valve element 135. A spring 145 acts between the valve element 135 and a flange on the stem 137, and a spring 147 acts between a flange on the stem 137 and a flange on the mounting member 129. A seal 149 seals the stem to the valve element 135 to prevent leakage between the stem 137 and the valve element 135 in the closed position.

When the weakened region deforms or fractures so that the stems 137 and 137a are allowed to move relative to the valve body 15, the springs 147 and 147a urge the stems and their associated valve elements 135 and 135a toward the closed position. Although the springs 145 and 145a are stronger than the springs 147 and 147a, the detents 139 and 139a are locked so that the relatively strong spring has no effect on this advancing movement. When the detents 139 and 139a advance beyond the ends of their associated mounting members 129 and 129a, the detents can escape radially outwardly with the result that the stems 137 and 137a are freed for movement relative to their associated valve elements. With the detents released, the spring 145a urges the stem 137a to a retracted position and urges the valve element 135a into sealing engagement with the seat 121a as shown in FIG. 10. The valve section 13 functions in an identical manner.

In all embodiments the valve is triggered in response to minimum valve deflection which may be less than the deflection required for complete separation of the valve sections. In all embodiments the stems are retracted, and the valve is devoid of structure projecting beyond the valve element (in the closed position) which might allow debris to open the valve. The valve element is recessed in all embodiments. In all embodiments, but to a lesser degree in the embodiment of FIG. 3, the region between valve sections remains sealed for a period following rupture of the weakened region.

Although exemplary embodiments of the invention have been shown and described, many changes, modifications and substitutions may be made by one having ordinary skill in the art without necessarily departing from the spirit and scope of this invention.

We claim:
1. A crashworthy valve comprising:
body means having a passage therethrough, said body means including first and second sections, coupling means for connecting said first and second sections, and a frangible region which allows relative movement between said sections when said sections are subjected to a predetermined load;
means defining a valve seat in said passage;
a valve element mounted for movement in said passage of said body means;
means for urging said valve element to a closed position in which it is in engagement with said valve seat to close said passage;
a restraining element;
detent means for drivingly connecting said valve element and said restraining element so that said valve element can drive said restraining element in a first direction at least when said valve element is moving toward said closed position;

abutment means engageable with said restraining element for preventing said restraining element from being driven by said valve element in said first direction, said restraining element and said abutment means being relatively movable in response to said relative movement between said sections so that said abutment means no longer prevents said valve element from driving said restraining element in said first direction; and means responsive to said valve element driving said restraining element a limited distance in said first direction for releasing said detent means whereby said urging means can thereafter drive the valve element to the closed position without driving said restraining element.

2. A crashworthy valve as defined in claim 1 wherein said abutment means includes a bendable tab mounted on one of said sections.

3. A crashworthy valve as defined in claim 1 wherein said coupling means allows relative rotational movement between said sections.

4. A crashworthy valve as defined in claim 1 wherein said coupling means includes said frangible region and a second frangible region, said first and second regions being relatively weak in response to first and second loading modes, respectively, said first and second regions being spaced and said first and second modes being different.

5. A crashworthy valve as defined in claim 1 wherein said frangible region fails in response to axial compressive loads, said relative axial movement between said sections being the result of compressive failure of said frangible region.

6. A crashworthy valve as defined in claim 1 wherein said coupling means includes a sleeve telescopically receiving at least one of said sections, said sleeve includes said frangible region, said valve including a seal axially intermediate said frangible region and said valve seat whereby said sections can remain sealed to each other after fracture of the frangible region.

7. A crashworthy valve as defined in claim 1 wherein said frangible region fractures in response to said predetermined load, said valve element is recessed from said frangible region even when said valve element is in said closed position.

8. A crashworthy valve as defined in claim 1 wherein said restraining element projects generally axially of said valve element and is not directly coupled to said abutment means.

9. A crashworthy valve comprising:
body means having a passage therethrough, said body means including first and second sections and coupling means for connecting said first and second sections, at least a portion of said body means being frangible to allow relative movement between said sections when said sections are subjected to a predetermined load;

means defining first and second valve seats in said passage, said first and second valve seats being in said first and second sections, respectively;

first and second valve elements mounted for movement in said passage toward said first and second valve seats, respectively, each of said valve elements having a closed position in which it engages the associated valve seat to close the passage and an initial position in which it is spaced from the associated valve seat and is substantially prevented from moving further away from the associated valve seat without fracturing the valve;

means for urging each of said valve elements to its closed position;

first and second restraining elements associated with said first and second valve elements, respectively, and extending generally toward each other;

first detent means for drivingly interrelating the first restraining element and the first valve element so that said first valve element can drive the first restraining element generally toward the second restraining element at least when the first valve element is moving toward said closed position thereof;

second detent means for drivingly interrelating the second valve element and the second restraining element so that the second valve element can drive the second restraining element generally toward said first restraining element at least when said second valve element is moving toward said closed position thereof;

each of said restraining elements being independent of each other and being disconnected so as to allow relative movement therebetween when the frangible region ruptures;

said restraining elements being arranged in opposing relationship so that the first and second valve elements are prevented from moving to the closed positions by the second and first restraining elements, respectively, and upon fracture of the frangible region, said restraining elements are displaced relative to each other to allow said valve elements to move toward their closed position; and at least one of said detent means being releasable in response to movement of the associated valve element and restraining element toward the closed position for a predetermined distance whereby such valve element can thereafter move to the closed position independently of its associated restraining element.

10. A crashworthy valve as defined in claim 9 wherein said restraining elements are in abutting relationship.

11. A crashworthy valve comprising:
first and second valve bodies, each of said valve bodies having a passage therein, said first and second valve bodies defining first and second valve seats, respectively, in their respective passage;

first and second valve elements mounted for movement in the passage of said first and second valve bodies, respectively;

first biasing means for urging said first valve element into a closed position in which it is in engagement with said valve seat to close the passage of said first valve body;

second biasing means for urging said second valve element to a closed position in which it is in engagement with said second valve seat to close the passage of said second valve body, each of said valve elements having an open position in which it is spaced at least a predetermined distance from its valve seat;

coupling means for interconnecting said valve bodies with said passages thereof being in fluid communication, each of said valve elements moving toward the other of said valve elements in moving from the open position thereof toward the closed position thereof;

means defining a weakened region on said valve which is deformable in response to a predetermined load to allow relative movement between said valve bodies;

first and second restraining elements mounted, respectively, in said first and second valve bodies;

first detent means for drivingly connecting the first restraining element and the first valve element so that said first valve element can drive the first restraining element is a first direction at least when said first valve element is moving toward said closed position thereof;

second detent means for drivingly connecting the second valve element and the second restraining element so that said second valve element can drive the second restraining element in a second direction at least when said second valve element is moving toward said closed position thereof, said restraining elements projecting generally axially of their respective valve elements and into engagement with each other to thereby normally prevent said valve elements from moving to the closed positions thereof; and at least one of said detent means being releasable in response to relative axial movement between said valve bodies of less than said predetermined distance to release said one detent means whereby the first and second biasing means can urge both of said valve elements to said closed positions.

12. A crashworthy valve as defined in claim 11 including means for retracting said first restraining element relative to said valve element at least when the valve element is in said closed position.

13. A crashworthy valve as defined in claim 11 wherein said valve seats are closely adjacent so that the lengths of said passages between said valve seats are minimized.

14. A crashworthy valve comprising:
a valve body having a passage therein, said valve body defining a valve seat in said passage;
a valve element mounted for movement in said passage of said valve body;
means for urging said valve element to a closed position in which it is in engagement with said valve seat to close said passage;
a member adapted to carry the fluid;
coupling means for coupling the valve body to the member, said coupling means including frangible means rupturable in response to a tensile load to allow separation of the valve body and the member;
means for releasably holding the valve element in an open position in which the valve element is spaced from the valve seat at least a predetermined distance, the last mentioned means being responsive to relative movement between said valve body and the member to release said valve element whereby the urging means can urge the valve element to said closed position;
seal means for sealing the region between said member and said valve seat for a time following rupture of the frangible means in response to a tensile load; and
said coupling means including a sleeve at least a portion of said sleeve receiving at least a portion of one of said valve body and said member and said frangible means including a frangible region of said portion of said sleeve, said seal means including a resilient deformable seal between the sleeve and said one of said valve body and said member, said seal being axially intermediate said frangible region and said valve seat.

15. A crashworthy valve comprising:
body means having a passage therethrough, said body means including first and second sections and a frangible region which allows relative movement between said sections when said sections are subjected to a predetermined load;
means defining a valve seat in said passage;
at least one valve element mounted for movement in said passage of said body means;
resilient means for urging said valve element to a closed position in which it is in engagement with said valve seat to close said passage;
a restraining element mounted in said body means;
abutment means engageable with said restraining element for holding said restraining element in a first position, said restraining element being movable relative to said abutment means in response to said relative movement between said sections whereby said restraining element can move out of said first position;
a locking member engageable with said valve element, said restraining element holding said locking member and said valve element in cooperative locking relationship to prevent the valve element from moving to a closed position when said restraining element is in said first position and allowing said valve element to become free of said locking member when said restraining element moves out of said first position whereby the resilient means can move the valve element to a closed position; and
said restraining element being axially compressively loaded against said abutment means at least when the restraining element is in said first position.

16. A crashworthy valve as defined in claim 15 wherein said restraining element is structurally independent of and disconnected from said abutment means, said valve element being a first valve element mounted in said first section, said valve including a second valve element mounted in said second section, said abutment means being structure other than said second valve element.

17. A crashworthy valve comprising body means having a passage therethrough, said body means including first and second sections and a frangible region which allows relative movement between said sections when said sections are subjected to a predetermined load;
means defining a valve seat in said first section, at least one valve element mounted for movement in said first section of said body means;
resilient means for urging said valve element to a closed position in which it is in engagement with said valve seat to close said passage;
holding means for holding the valve element in an open position in which the valve element is spaced from the valve seat;
said valve element being movable in a first direction relative to said first section to a releasing position in response to a predetermined amount of said relative movement between said sections, said valve element being spaced from said valve seat in said releasing position; and said valve element being freed of said holding means in response to said valve element reaching said releasing position whereby the movement of said valve element from said open position to said releasing position causes the release of said valve element and allows said resilient means to subsequently move the valve element to the closed position.

18. A crashworthy valve comprising:

body means having a passage therethrough, said body means including first and second sections and a frangible region which allows relative movement between said sections when said sections are subjected to a predetermined load;

means defining a valve seat in said passage;

at least one valve element mounted for movement in said passage of said body means;

resilient means for urging said valve element to a closed position in which it is in engagement with said valve seat to close said passage;

releasable means for holding the valve element in an open position in which the valve element is spaced from the valve seat;

said valve element being movable in a first direction in response to said relative movement between said sections;

said releasable means being responsive to a predetermined amount of said movement of said valve element in said first direction for releasing said valve element whereby said resilient means can move the valve element to the closed position; and said releasable means including a restraining element, abutment means engageable with said restraining element for holding said restraining element in a first position, and a locking member, said restraining element being movable relative to said abutment means out of said first position in response to said relative movement between said sections, said valve element being movable in said first direction in response to said movement of said restraining element, said restraining element holding said locking member and said valve element in cooperative locking relationship to prevent the valve element from moving to the closed position when said restraining element is in said first position and allowing said valve element to become free of said locking member when said restraining element moves out of said first position whereby said resilient means can move the valve element to a closed position.

19. A crashworthy valve as defined in claim 18 wherein said restraining element is compressively loaded when the restraining element is in the first position.

* * * * *